(12) United States Patent
Haringer

(10) Patent No.: US 6,394,204 B1
(45) Date of Patent: May 28, 2002

(54) CRAWLER OR TRACKED VEHICLE HAVING PIVOTABLE TRACKS

(75) Inventor: Alois Johann Haringer, Neumarkt (IT)

(73) Assignee: macmoter S.p.A., Modigliana (IT)

( * ) Notice: Subject to any disclaimer, the term of this patent is extended or adjusted under 35 U.S.C. 154(b) by 0 days.

(21) Appl. No.: 09/464,207

(22) Filed: Dec. 15, 1999

(30) Foreign Application Priority Data

Dec. 15, 1998 (DE) .......................................... 198 57 891

(51) Int. Cl.[7] ..................... B62D 55/084; B62D 55/108
(52) U.S. Cl. ..................... 180/9.52; 180/9.48; 180/9.54; 305/124
(58) Field of Search ............................. 180/9.54, 9.56, 180/9.58, 9.5, 9.48, 9.1, 9.52; 305/120, 121, 116, 124, 131, 141, 142

(56) References Cited

U.S. PATENT DOCUMENTS

| | | | | |
|---|---|---|---|---|
| 1,135,187 A | * | 4/1915 | Jett ........................... | 180/9.54 |
| 1,331,550 A | * | 2/1920 | Wishon ...................... | 180/9.54 |
| 1,400,690 A | * | 12/1921 | Lewis ........................ | 180/9.54 |
| 1,443,787 A | * | 1/1923 | Frwnch ...................... | 180/9.54 |
| 3,037,571 A | * | 6/1962 | Zelle | |
| 4,457,388 A | * | 7/1984 | Koehler et al. ............ | 180/9.48 |
| 5,904,216 A | * | 5/1999 | Furusawa ................... | 180/193 |

* cited by examiner

Primary Examiner—Anne Marie Boehler
(74) Attorney, Agent, or Firm—W. F. Fasse; W. G. Fasse (57) ABSTRACT

A crawler or tracked vehicle has a running gear with separately operable tracks, and a vehicle body pivotably connected to the running gear about a substantially horizontal pivot axis that allows the running gear to pivot relative to the vehicle body. The two tracks can pivot independently of each other and independently of the vehicle body. At least one spring arrangement preferably including a spring and a shock absorber is arranged on each side of the body, and is respectively connected between the running gear and the vehicle body. The spring may be vertically or horizontally oriented.

19 Claims, 9 Drawing Sheets

CRAWLER OR TRACKED VEHICLE HAVING PIVOTABLE TRACKS

PRIORITY CLAIM

This application is based on and claims the priority under 35 U.S.C. §119 of German Patent Application 198 57 891.1, filed on Dec. 15, 1998, the entire disclosure of which is incorporated herein by reference.

FIELD OF THE INVENTION

The invention relates to a crawler or tracked vehicle having a running gear with separately operable tracks, a vehicle body arranged generally above the running gear, and at least one tool.

BACKGROUND INFORMATION

Crawlers or tracked vehicles, also commonly known as caterpillar vehicles or smaller "skid-track" vehicles, have been used for a long time and are well known in the art. They are generally equipped with at least one tool such as a dozer blade, a bucket loader, a backhoe or digging bucket, a trencher, forestry equipment, a lifting crane, or the like. They are primarily used as construction or earth-moving vehicles at construction sites, and their primary applications lie in transmitting large forces to the ground and being able to operate on uneven or rough terrain. Such crawler vehicles are also used as military transport and battle vehicles, and as transport or work vehicles on snowy and icy terrains.

Conventionally in such crawler vehicles, the running gear including the crawler tracks is rigidly mounted with respect to the vehicle body. As a result, one of the difficulties of operating such a crawler vehicle is that the tilting motions of the running gear and particularly of the crawler tracks, arising from moving over uneven or rough terrain, are also transmitted directly to the body of the vehicle and thus to the operator. Thereby the operator is subjected to tilting movements that may cause discomfort and may present an unsafe operating condition. Moreover, if the entire vehicle body is forced to tilt with the tilting of the crawler tracks, then the vehicle may become unstable and likely to tip over when operating on very rough or uneven terrain. The conventional crawler vehicle also suffers a limitation on the degree of unevenness or roughness that it can traverse, because the two crawler tracks are not able to tilt independently. Thus, conventional crawlers are not well suited for operating on terrain that is irregularly uneven in two or three dimensions, e.g. with a different direction of slope of the ground under each of the two crawler tracks.

SUMMARY OF THE INVENTION

In view of the above, it is an object of the invention to provide a crawler or tracked vehicle and especially a so-called skid-track vehicle that is so designed that the tilting movements of the crawler tracks resulting from traveling over uneven or rough terrain are significantly reduced and/or damped before they are passed on to the vehicle body. In other words, it is an object of the invention to substantially isolate the vehicle body from the tilting movements of the running gear and particularly the crawler tracks. The invention further aims to avoid or overcome the disadvantages of the prior art and to achieve advantages as are apparent from the present specification.

The above objects have been achieved according to the invention in a crawler or tracked vehicle having a running gear with separately operable tracks, and a vehicle body that is pivotably connected to the running gear so as to be pivotable about at least one pivot axis. Preferably the pivot axis is substantially horizontal (e.g. within +/−5 degrees of horizontal when the crawler is standing on level horizontal ground). More particularly the pivot axis is preferably parallel to the rotation axes of track deflection wheels of the crawler track arrangements.

The crawler vehicle according to the invention includes at least one pivot axle that physically pivotably connects the vehicle body with the running gear and defines the above mentioned at least one pivot axis. Preferably two respective pivot axles independently connect the vehicle body with the two respective crawler track arrangements of the running gear, so that each crawler track arrangement is tiltable independently of the other and independently of the vehicle body. The crawler vehicle further includes at least one spring arrangement that is arranged at a distance from the pivot axis and that elastically connects the running gear and the vehicle body. The spring arrangement allows the running gear to pivot and tilt with some freedom of movement relative to the vehicle body and attenuates and/or delays the transmission of some of the tilting movements from the running gear to the vehicle body.

The spring arrangement comprises a respective helical spring preferably arranged on each side of the vehicle body, whereby these helical springs can be arranged substantially vertically or substantially horizontally. In this context, "substantially vertically" means within +/−10 degrees of true vertical, and "substantially horizontally" means within +/−10 degrees of true horizontal, when the crawler vehicle is standing on level horizontal ground. One end of each helical spring is connected to the frame of the vehicle body and the other end thereof is connected to a respective one of the crawler track arrangements of the running gear. The spring arrangement preferably further comprises a hydraulic or pneumatic damper device, such as any conventional shock absorber, arranged in parallel with each helical spring to damp out the relative tilting or pivoting movements between the crawler track arrangements and the vehicle body.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
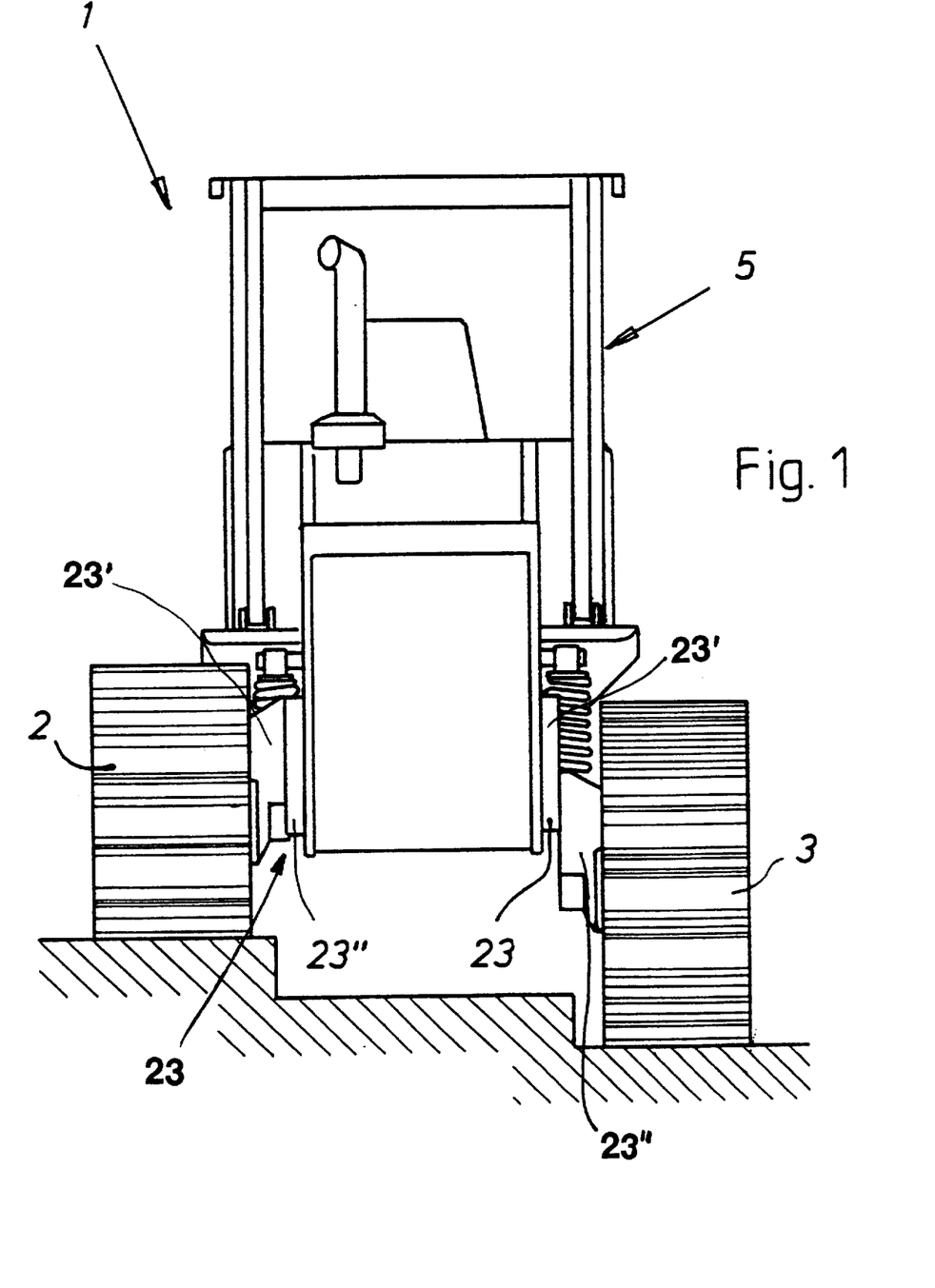
FIG. 1 is a frontal view of a first embodiment of the inventive crawler vehicle having a substantially vertical helical spring, with one crawler track tilted down relative to the other track and the vehicle body.
Figure 2:
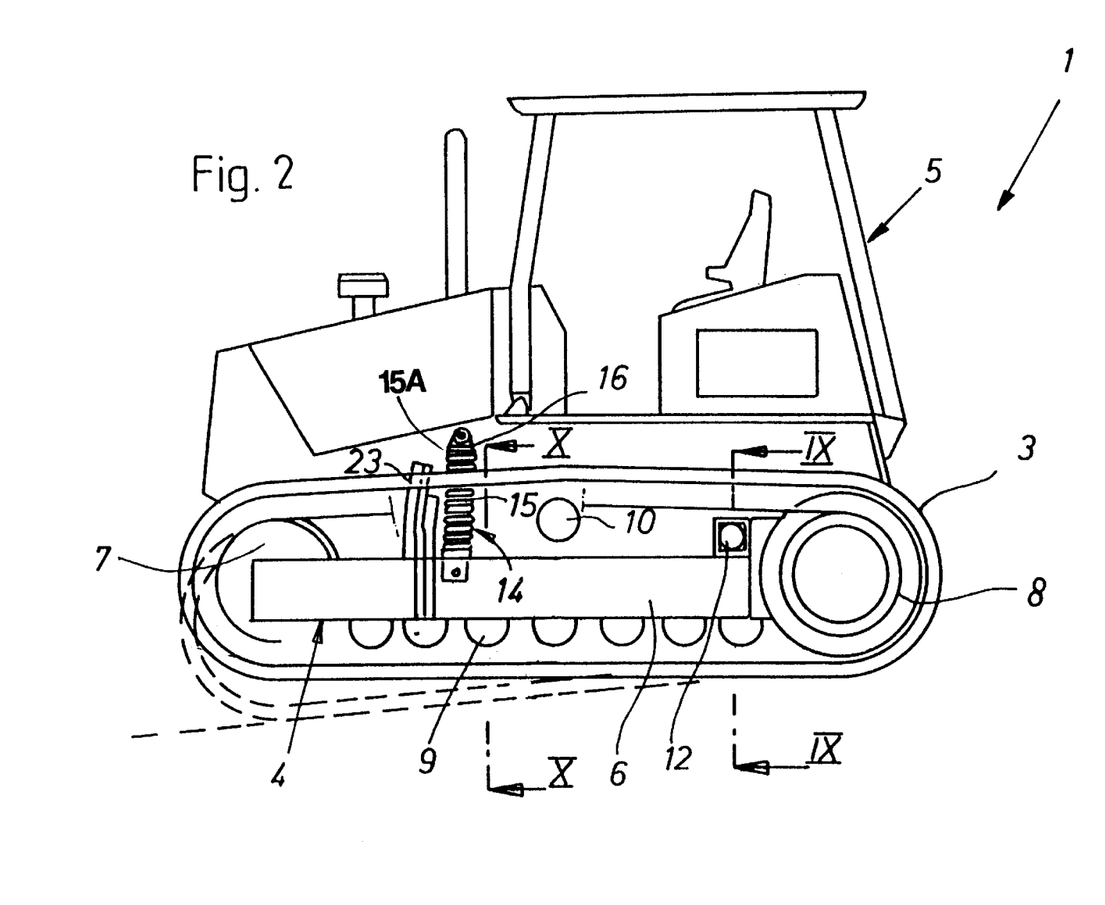
FIG. 2 is a side view of the crawler vehicle according to FIG. 1, showing various tilt positions of one crawler track in ghost lines.

As can be seen in FIGS. 1 and 2, a crawler or tracked vehicle 1 includes a running gear 4 having separately drivable crawler track arrangements including tracks 2 and 3, a vehicle body 5 arranged above or on the running gear 4 so that the tracks 2, 3 run along each side of the vehicle body, and at least one tool (not shown). The vehicle body 5 includes a frame, an engine, a drive transmission, a hydraulic pump, and an operator cabin including an operator seat and various controls for the engine, transmission and the tool or tools. The various components of the vehicle body can be in accordance with any conventional crawler vehicle, and are not directly pertinent to the present disclosure.

Each track arrangement includes a respective endless link track 2, 3, as well as a longitudinal support member or chassis member 6, front and rear sprocket wheels 7, 8, respectively, which act as deflection wheels for the track 2 or 3, and track support wheels 9, 10 which respectively support the bottom strand and the top strand of the track 2 or 3. The chassis member 6 runs parallel to the longitudinal axis of the crawler or tracked vehicle 1 and has one sprocket wheel 7, 8 arranged at the front and rear ends of the chassis member 6 to guide and drive the tracks 2, 3.

Figure 3:
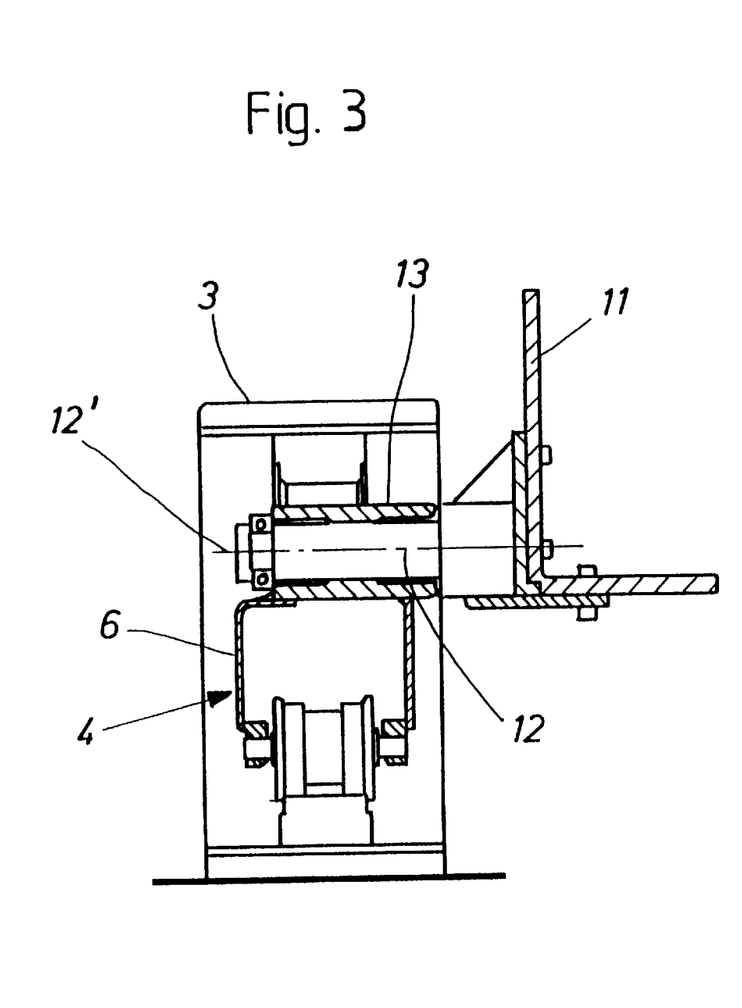
FIG. 3 is an enlarged detail view of the pivot axle of the crawler vehicle according to FIGS. 1 and 2, as seen on the section plane IX—IX in FIG. 2.
Figure 4:
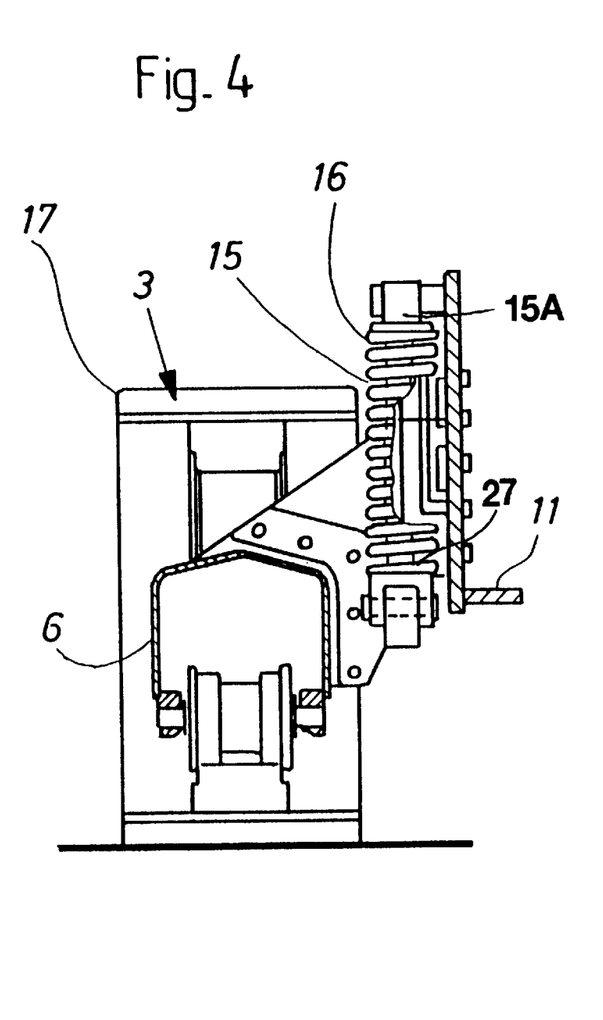
FIG. 4 is an enlarged detail view of a vertically arranged helical spring in the crawler vehicle according to FIGS. 1 to 3, as seen on the section plane X—X in FIG. 2.
Figure 5:
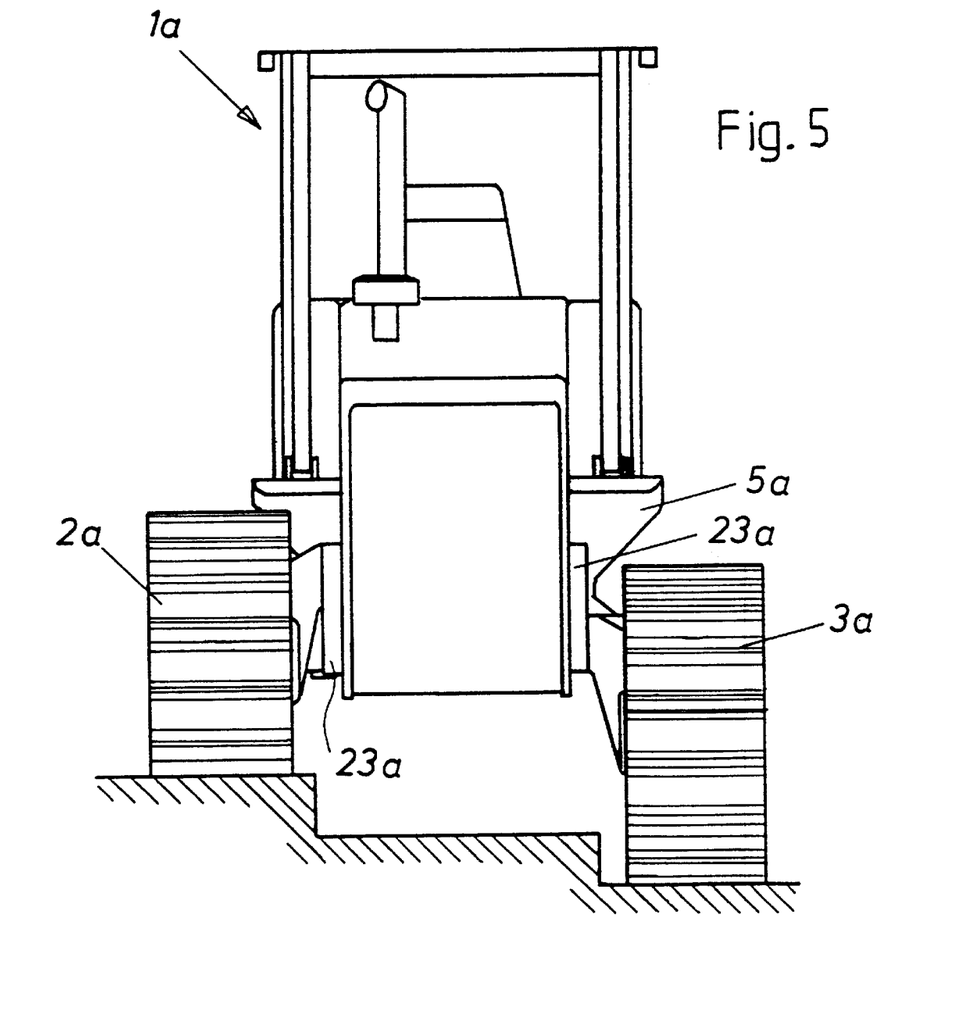
FIG. 5 is a frontal view similar to that of FIG. 1, but showing a second embodiment of an inventive crawler vehicle having a substantially horizontally arranged helical spring.

The body 5 is pivotably coupled to the running gear 4 by means of a pivot axle 12 (or preferably a respective individual pivot axle 12 on each respective side of the vehicle). The respective pivot axle 12 pivotably couples a frame 11 of the vehicle body 5 and the chassis member 6. The frame 11, which is box-shaped in the illustrated example embodiments, can be seen partially in FIGS. 9 and 10 and is also shown in FIGS. 3 and 4 as a fragment of a frame wall. The pivot axle 12 runs horizontally and perpendicular to the longitudinal axis of the vehicle and is rigidly fastened to the frame 11, preferably with removable fasteners such as bolts so as to be adjustable in height. The chassis member 6 of each respective track arrangement of the running gear 4 is pivotably mounted on the pivot axle 12, for example, by a pivot bearing sleeve 13 that is rigidly mounted on the top of the chassis member 6.

The bearing sleeve 13 and the pivot axle 12 are located directly above the chassis member 6 and slightly forward of the rear sprocket wheel 8 relative to the longitudinal direction of the vehicle, as shown in FIG. 2. The pivot axle 12 forms a pivot axis 12', about which the chassis member 6 on the running gear 4 pivots. Particularly, the pivot axis 12' is located on a vertical plane that passes between the front and rear sprocket wheels, at a distance in front of the rear sprocket wheel corresponding to 10 to 30%, or preferably 15 to 25%, or most preferably about 20% of the total distance between the rotation axes of the front and rear sprocket wheels. Thereby, the tilting or pivoting of the tracks 2 and 3 can be most effectively isolated from the vehicle body 5, and particularly from the operator seated on the seat generally toward the rear of the vehicle above the rear sprocket wheels. Also, by keeping the pivot axis 12' close to the rear sprocket wheels, which may be the powered drive sprocket wheels, the power transmission from the engine mounted on the vehicle body to the rear sprocket wheels is simplified, because there are no significant displacements between the vehicle body and the rear sprocket wheel axis which is close to the pivot axis 12'.

As can be seen in FIG. 2, a spring arrangement 14 is fastened or pivotably coupled to the chassis member 6 between the pivot axle 12 and the front sprocket wheel 7, at a distance from the pivot axle 12 and a distance from the front sprocket wheel 7. According to a first example embodiment shown in FIGS. 1 to 4, the spring arrangement 14 includes at least one substantially vertical helical spring 15 coupled to each crawler track arrangement of the running gear 4. An upper end 16 of the helical spring 15 is attached to or coupled with the body 5. As shown in FIG. 4, the coupling point for the upper end 16 of the helical spring 15 is located on the side of the body 5 on the frame 11. The lower end 27 of the helical spring 15 is connected to the running gear 4, as can be seen in FIG. 4. More particularly, the spring 15 is preferably arranged concentrically around a motion damping shock absorber 15A, and the upper and lower ends of the spring 15 are respectively connected to or supported against upper and lower ends of the shock absorber 15A, which in turn are connected to the vehicle body and the chassis of the crawler track arrangement respectively.

As shown in FIGS. 2 and 4, the helical spring 15 is arranged outside of the body 5 and/or the frame 11 and the upper coupling point of the helical spring 15 lies above the upper run or strand 17 of the link track 3. Thus, the helical spring 15 is arranged between the track 3 and the frame 11, which, in all the example embodiments described herein, is box-shaped.

As can be seen in FIGS. 1 and 2, in the first example embodiment the helical spring 15 is arranged substantially vertically, with the upper end of the helical spring 15 tilted slightly toward the rear of the vehicle relative to the lower end of the spring 15 when the crawler vehicle 1 is standing on a horizontal ground surface. This slight tilt of the spring 15 places the helix axis of the spring generally tangentially along the circular pivot arc defined by pivoting about the pivot axis 12' so that the spring force is effectively oriented relative to the pivoting. Furthermore, a pivot guide 23 comprising a lower guide 23" and an upper guide 23' is provided to guide the movements of the running gear 4 as it pivots about the pivot axis 12'. At least one of these guides has an arcuate curved shape following the pivot arc about the pivot axis 12', as can be seen in FIG. 2. The upper guide 23' is fixedly attached to the vehicle body 5 and the lower guide 23" is attached to the chassis member 6 of the running gear 4. The upper and lower guides 23', 23" are slidably interconnected and constrain the movements of the running gear 4 to precise pivoting movements about the pivot axis 12'. Some of the forces acting on the running gear 4 relative to the vehicle body 5 are taken up by the guide arrangement 23 and the proper pivoting alignment between the running gear 4 and the vehicle body 5 is maintained by the guide arrangement 23, so that the pivot axles 12 are not solely responsible for withstanding all of the forces.

FIGS. 5 to 8 show a second example embodiment of a crawler or tracked vehicle 1A in which the springs are not oriented in the vertical direction, but run substantially horizontally. In these FIGS. 5 to 8, most of the components other than the spring arrangements are the same as those in the first example embodiment and accordingly have the same reference numbers with a letter A added to them.

Figure 6:
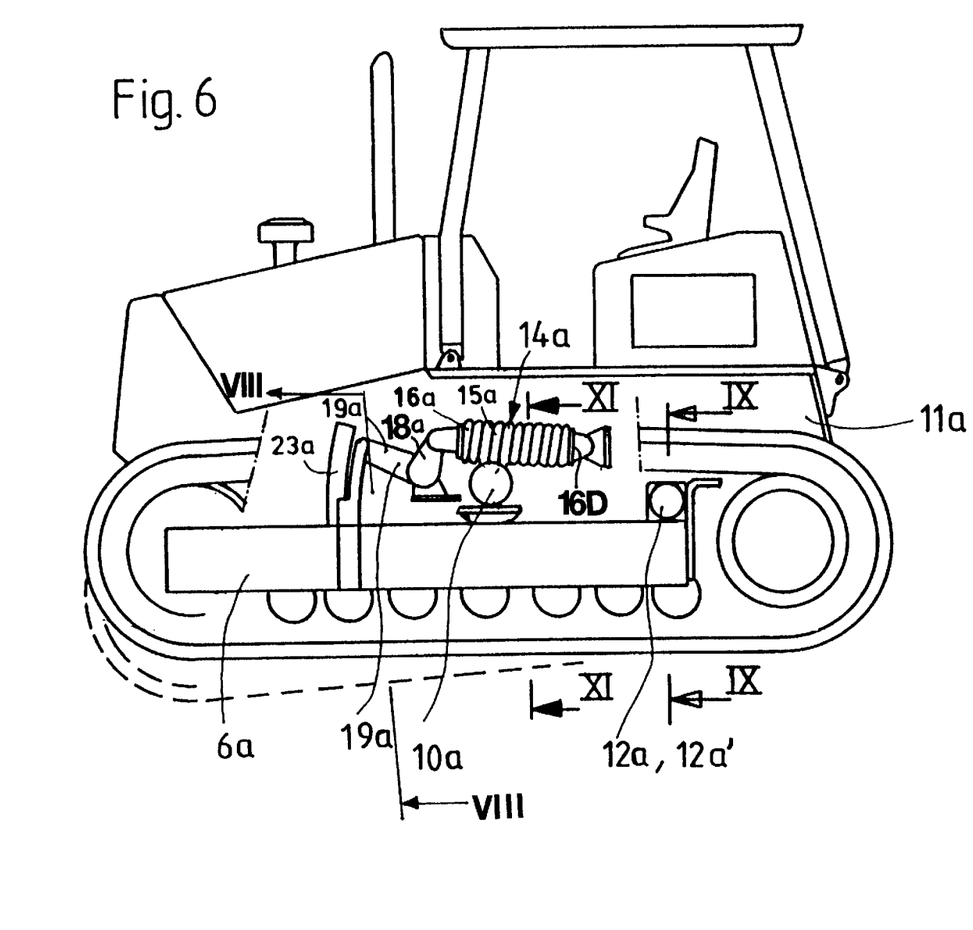
FIG. 6 is a side view of the crawler vehicle according to FIG. 5.
Figure 11:
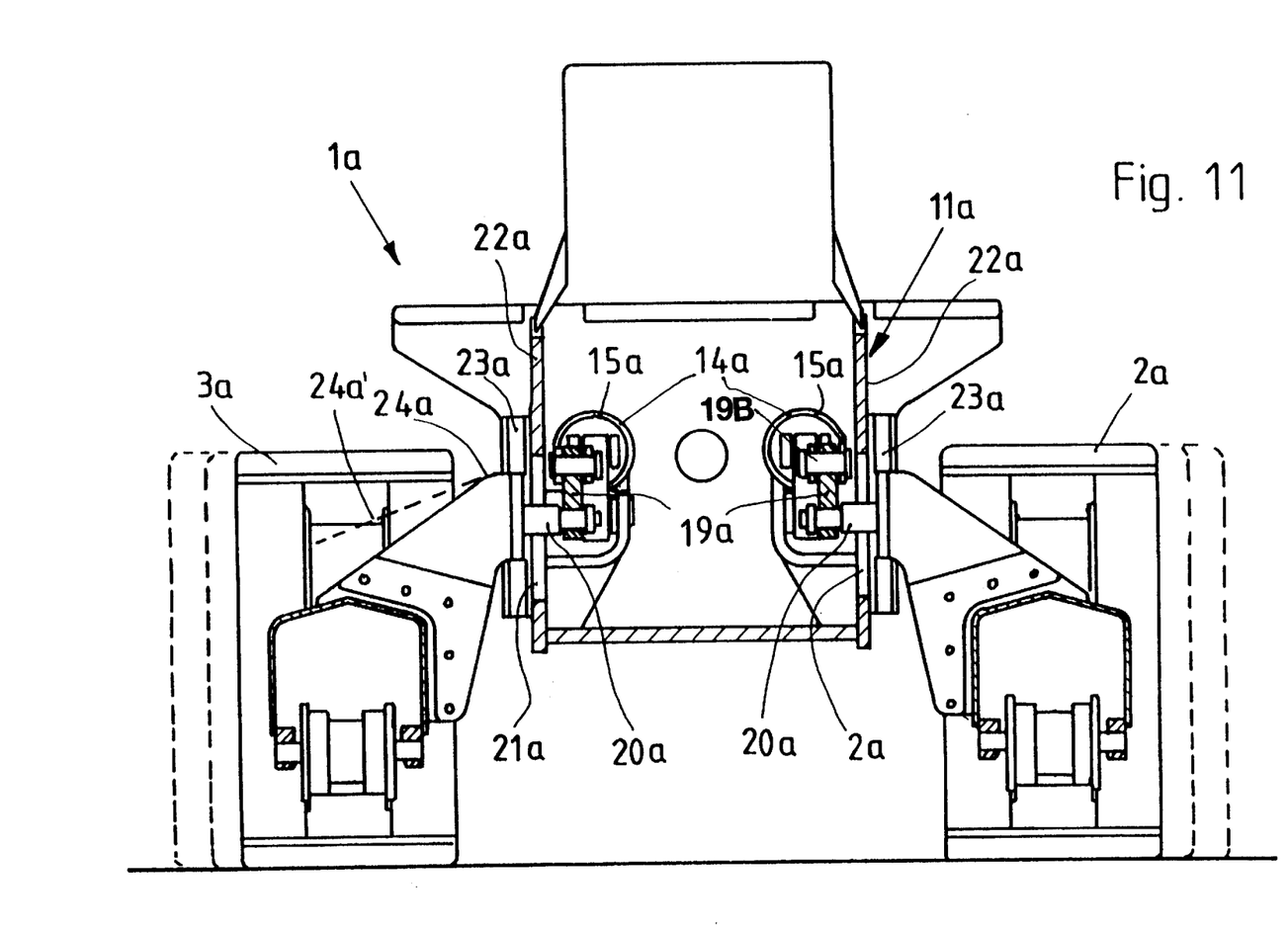
FIG. 11 is a sectional view along the section plane XI—XI in FIG. 6 illustrating variations of the track width of the vehicle having a horizontal spring arrangement, by providing adapters of various sizes.

As can be seen in FIG. 6, the helical spring 15A belonging to a spring arrangement 14A is arranged substantially horizontally. A first end 16D of the spring 15A is coupled to the frame 11A and a second end 16A is pivotably coupled to first arm 18A of a two-armed pivot lever or angle lever 19A. Particularly, the spring 15A may be arranged concentrically around a shock absorber, and the ends of the spring are braced against or connected to the ends of the shock absorber, which in turn are connected to the frame 11A and the lever 19A. The angle lever 19A is in turn pivotably coupled via a pivot shaft stub 19B to the frame 11A, as shown in FIG. 11. The second arm 19B of each angle lever 19A is connected to a respective one of the crawler track arrangements of the running gear 4 as will be explained next. Thereby the up-and-down pivoting motion of the respective track 2 or 3 relative to the vehicle body 5 is converted via the pivoting two-armed armed lever 19A into a horizontally directed motion that is directed into the horizontally oriented spring 15A.

In this second example embodiment, the two spring arrangements 14A including the two helical springs 15A are located within the frame 11A, as are also the two angle levers 19A, as is also shown in FIG. 11. Connecting arms 20A pass through openings 21A in sidewalls 22A of the frame 11A and connect the angle levers 19A to the respective chassis member 6A that is arranged on each side of the frame 11A. Moreover, the arrangement of the single components is designed such that substantially vertical movements of the chassis member 6A will cause the spring length of the helical spring 15A to change, thereby delaying and/or attenuating the vertical movement that is transmitted to the vehicle body 5A through the frame 11A.

Figures 7, 8:
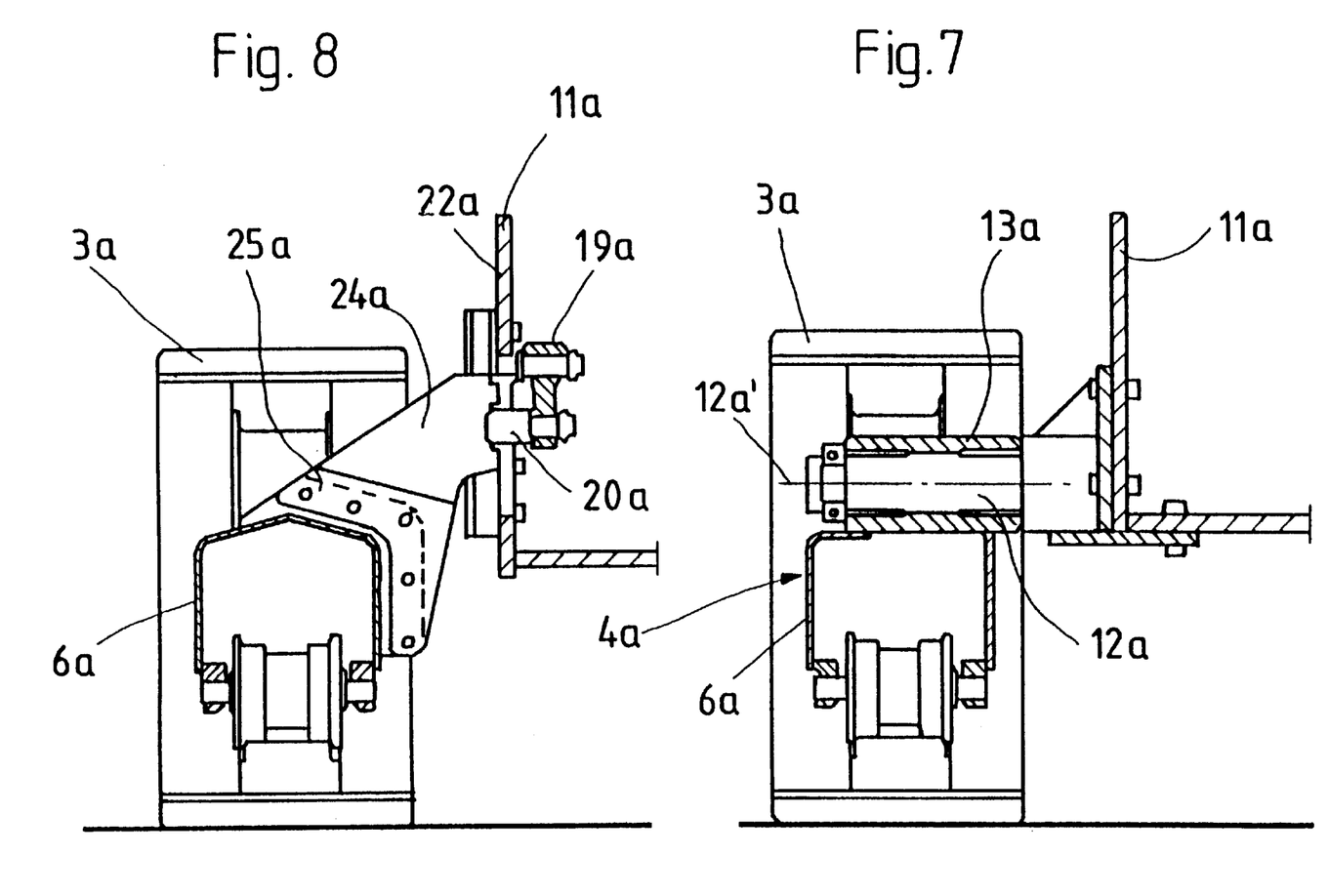
FIG. 7 is an enlarged detail view of the pivot axle of the crawler vehicle shown in FIGS. 5 and 6, as seen on the s section plane IX—IX in FIG. 6.
FIG. 8 is an enlarged detail view of a spacer bracket between the vehicle body and the running gear, as seen on the section plane VIII—VIII shown in FIG. 6.

It should be understood that the construction of and support for the pivot axle 12A in this second example embodiment is the same as that of the pivot axle 12 in the first example embodiment. Also, all other components and arrangements that have not been differently described here, correspond to those of the first embodiment. Thus, FIGS. 3 and 7 are identical.

As can be seen especially in FIG. 11, the connecting arm 20A that reaches through the side wall 22A is guided by a guide 23A. This guide 23A comprises a rail or track that is slightly curved, as shown in FIG. 6. The guide generally corresponds to the pivot guides described above in connection with the first embodiment. A console-like or bracket-like spacer 24A is connected as an extension to the connecting arm 20A. This spacer 24A is attached to the chassis member 6A by an adapter piece 25A on the chassis member 6A that is fastened to the spacer 24A by fasteners such as screws, as shown in FIG. 8.

Figure 9:
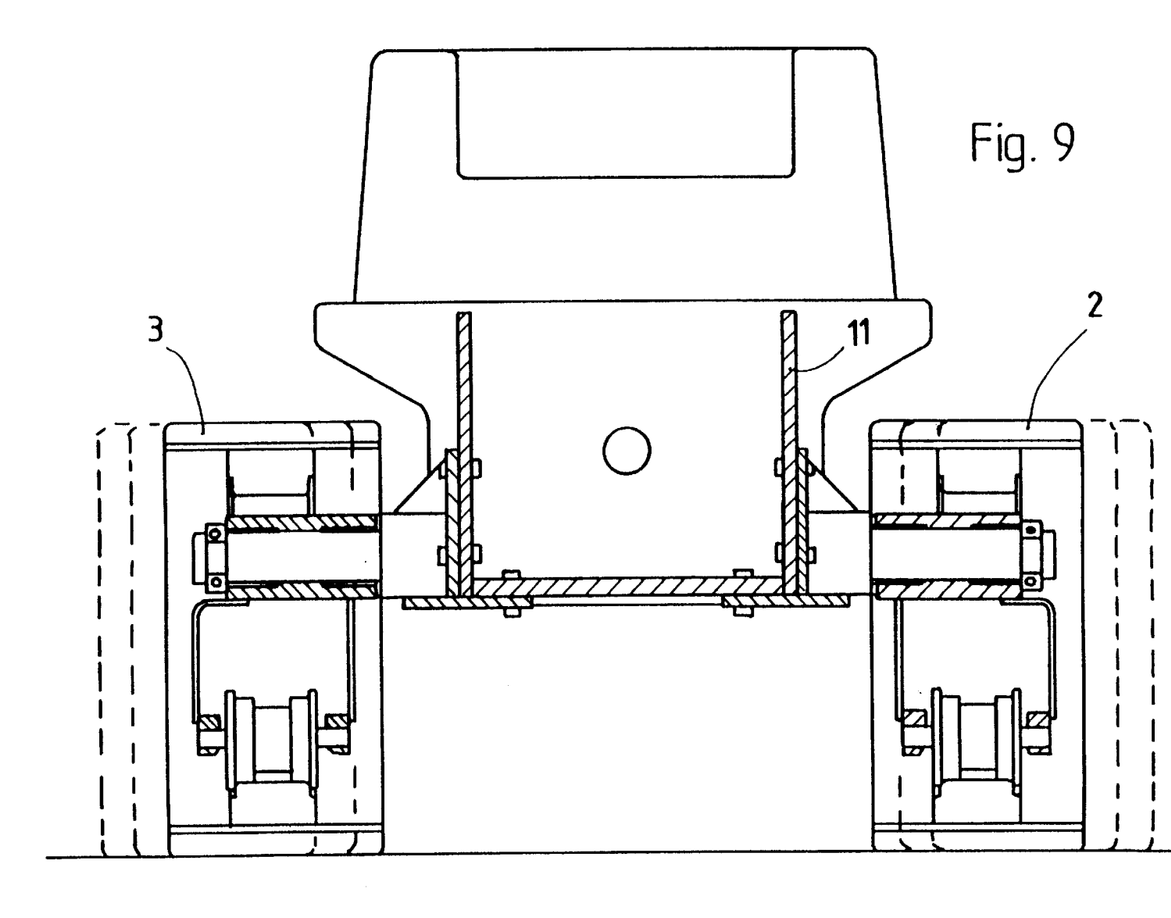
FIG. 9 is a sectional view of a portion of the crawler vehicle of either embodiment, along the section plane IX—IX in FIGS. 2 and 6, illustrating variations of the track width of the crawler vehicle by providing axle mounting sleeves or axles of different lengths.
Figure 10:
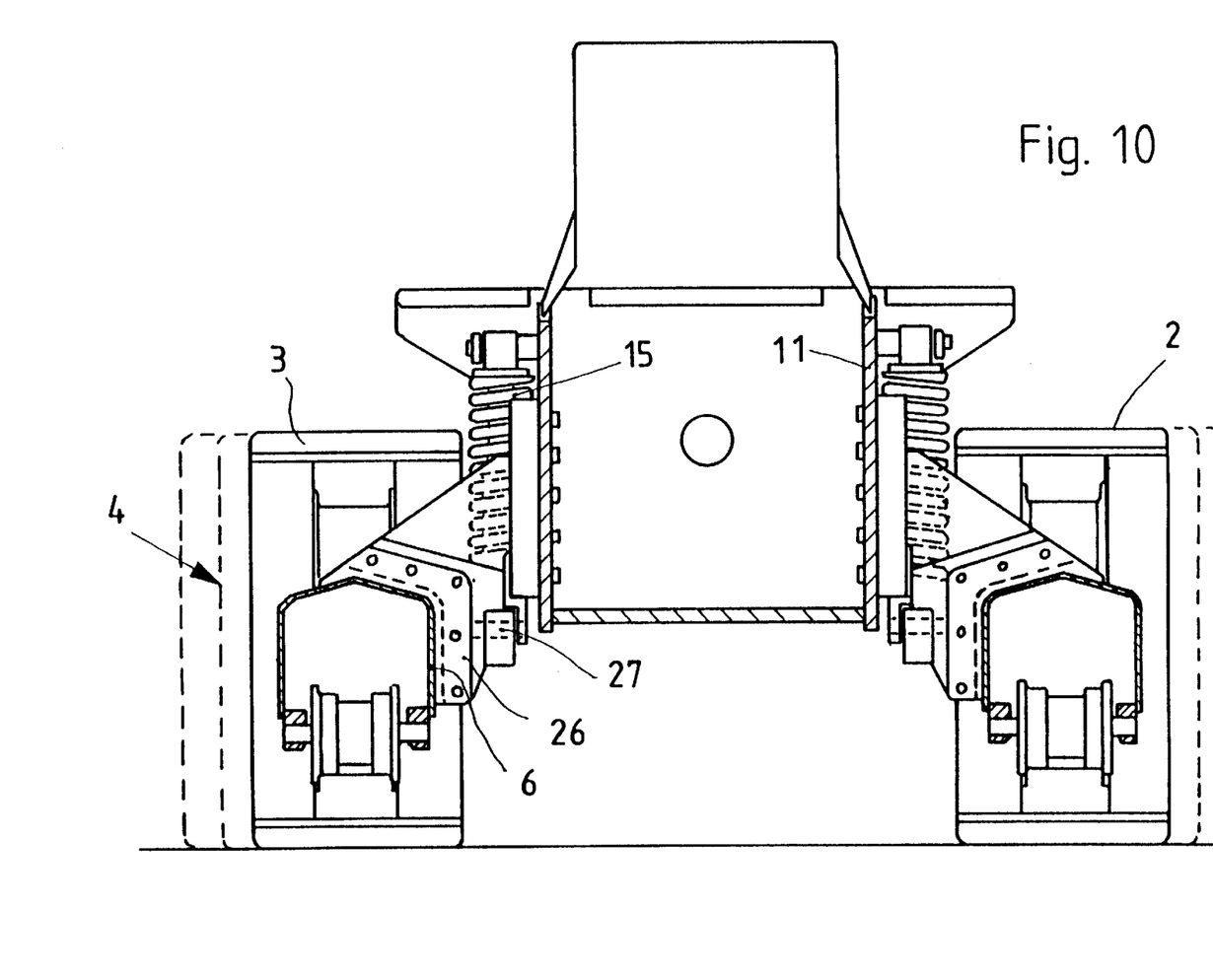
FIG. 10 is a sectional view along the section plane X—X in FIG. 2 illustrating variations of the track width of the crawler vehicle having a vertical spring arrangement, by providing adapters of various sizes.

FIGS. 9 to 11 are sectional views of the crawler or tracked vehicle 1, 1A, which illustrate how the spacing or distance between the tracks 2, 2A or 3, 3A and the respective frame 11, 11A can be varied to accommodate customer specifications regarding track width without having to modify the basic vehicle. As can be seen in FIG. 9, the track width can be modified to provide different pivot axle mounting sleeves 13, 13A, or different pivot axles 12, 12A, respectively having different axial lengths. By replacing the prior or original mounting sleeves or pivot axles with the replacement components having a different axial length, this would adjust the distance between the vehicle body 5 and the running gear 4.

FIG. 10 illustrates another step that must be taken for changing the track width of a crawler or tracked vehicle having vertical spring arrangements. Namely, not only the track spacing at the pivot axis 12' but also the track spacing at the connection to the springs must be changed. This can be achieved by providing various sizes of adapters 26 that are arranged between the lower coupling point 27 of the helical spring 15 and the chassis member 6 of the running gear 4. Alternatively, as shown in FIG. 11, for a crawler or tracked vehicle having horizontal spring arrangements, variously sized spacers 24A, 24A' can be provided as a means of modifying the track width.

For each of the above embodiments, the ground clearance of the vehicle body can also be adjusted by simply bolting the pivot axles 12 to any selected one of a plurality of different height connection locations on the vehicle body, or by modifying the mounting for the pivot axles 12, 12A, for example by mounting the pivot axles via a slide bracket on the vehicle body. In this context, it is also possible to change the coupling between the running gear and the helical coil spring 15 or the angle lever 19A respectively.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A tracked vehicle comprising:
   a vehicle body comprising a body frame;
   separately operable first and second crawler track arrangements, which each respectively comprise a longitudinal support member extending parallel to a longitudinal axis of said tracked vehicle, front and rear track deflection wheels mounted rotatably on said longitudinal support member, track support wheels mounted rotatably on said longitudinal support member between said front and rear track deflection wheels, and a crawler track that runs around said longitudinal support member, is deflected around said front and rear track deflection wheels, and is supported by said track support wheels, wherein said first and second crawler track arrangements are respectively arranged on opposite left and right sides of said body frame;
   first and second pivot axles, which are respectively connected to said body frame on said opposite left and right sides thereof and extend laterally and substantially horizontally therefrom perpendicularly relative to said longitudinal axis of said tracked vehicle, and which are respectively connected to said longitudinal support members of said first and second crawler track arrangements so as to pivotally support said first and second crawler track arrangements relative to said vehicle body;
   first and second spring arrangements which are respectively connected directly or indirectly to said body frame of said vehicle body on said opposite left and right sides thereof, and which are respectively connected directly or indirectly to said longitudinal support members of said first and second crawler track arrangements at respective locations spaced away from said first and second pivot axles, and which respectively include first and second springs; and first and second pivot guide arrangements which each respectively comprise an upper guide member connected to said body frame of said vehicle body respectively on said left side or said right side thereof, and a lower guide member connected to said longitudinal support member of said first crawler track arrangement or said second crawler track arrangement respectively, wherein said first and second pivot guide arrangements are separated and spaced apart from said first and second springs of said first and second spring arrangements respectively, and wherein said upper guide member and said lower guide member are slidably interconnected to each other to allow mutual relative sliding of said upper guide member and said lower guide member along each other when said respective first or second crawler track arrangement pivots around said respective first or second pivot axle relative to said vehicle body.

2. The tracked vehicle according to claim 1 wherein said upper guide member and said lower guide member of said first and second pivot guide arrangements each respectively have an arcuate curved shape dimensioned and located corresponding to a pivot arc about said respective first or second pivot axle.

3. The tracked vehicle according to claim 1, wherein said first and second springs of said first and second spring arrangements are first and second helical coil springs arranged with helix axes thereof oriented substantially vertically and parallel to and longitudinally offset in one direction from said first and second pivot guide arrangements respectively.

4. The tracked vehicle according to claim 3, wherein said first and second spring arrangements respectively each include only a single spring, being said first and second helical coil springs respectively.

5. The tracked vehicle according to claim 3, wherein said first and second helical coil springs are longitudinally offset from said first and second pivot guide arrangements in said one direction being a direction toward said first and second pivot axles respectively, such that said first and second helical coil springs are located respectively between said first and second pivot guide arrangements and said first and second pivot axles.

6. The tracked vehicle according to claim 3, wherein said first and second helical coil springs respectively have lower ends that are respectively connected to said longitudinal support members of said first and second crawler track arrangements and upper ends that are connected to said body frame of said vehicle body.

7. The tracked vehicle according to claim 6, wherein said first and second spring arrangements further comprise respective first and second motion damping shock absorbers respectively arranged in parallel with said first and second helical coil springs, and wherein said shock absorbers respectively have lower ends respectively connected to said longitudinal support members of said first and second crawler track arrangements and upper ends connected to said body frame of said vehicle body.

8. The tracked vehicle according to claim 1; wherein said first and second springs of said first and second spring arrangements are first and second helical coil springs arranged with helix axes thereof oriented substantially horizontally.

9. The tracked vehicle according to claim 8, wherein said body frame of said vehicle body includes two longitudinally extending side frame members, and wherein said first and second helical coil springs are both arranged within said body frame inwardly between said two side frame members.

10. The tracked vehicle according to claim 9, wherein said first and second spring arrangements further comprise first and second two-armed pivot levers respectively having one lever arm connected to a first end of a respective one of said helical coil springs and another lever arm connected via a respective one of first and second connecting members to a respective one of said lower guide members which are connected respectively to said longitudinal support members of said first and second crawler track arrangements, wherein said first and second connecting members respectively extend from said two-armed pivot levers to said first and second crawler track arrangements through respective holes provided in said side frame members, and wherein a second end of each said respective one of said helical coil springs is connected to said body frame of said vehicle body.

11. The tracked vehicle according to claim 8, wherein said first and second spring arrangements further comprise first and second two-armed pivot levers respectively having one lever arm connected to a first end of a respective one of said helical coil springs and another lever arm connected to a respective one of said lower guide members which are connected respectively to said longitudinal support members of said crawler track arrangements, and wherein a second end of each said respective one of said helical coil springs is connected to said body frame of said vehicle body.

12. The tracked vehicle according to claim 1, wherein said first and second pivot axles are respectively rigidly connected to said body frame of said vehicle body at said opposite sides thereof, wherein said first and second crawler track arrangements respectively further comprise first and second pivot bearing sleeves which are removably connected to said longitudinal support members and pivotably receive a respective one of said pivot axles therein.

13. The tracked vehicle according to claim 12, further in combination with a kit of replacement parts comprising first and second replacement sleeves that respectively have the same inner diameter and a different axial length as compared to said first and second pivot bearing sleeves, and that are adapted to be removably connected to said longitudinal support members to replace said pivot bearing sleeves so as to change a track spacing width between said first and second crawler track arrangements correspondingly to said different axial length of said replacement sleeves as compared to said first and second bearing sleeves.

14. The tracked vehicle according to claim 1, further in combination with a kit of replacement parts comprising first and second replacement axles that respectively have the same outer diameter and a different axial length as compared to said first and second pivot axles, and that are adapted to be removably connected to said body frame of said vehicle body to replace said first and second pivot axles that were removably connected to said body frame so as to change a track spacing width between said first and second crawler track arrangements correspondingly to said different axial length of said replacement axles as compared to said pivot axles.

15. The tracked vehicle according to claim 1, further in combination with a kit of exchangeable replacement guide members which respectively have different lateral dimensions wherein each one of said replacement guide members is adapted to be selectively removably installed by being removably connected to said longitudinal support member of a respective one of said crawler track arrangements and slidably engaged with a corresponding one of said upper guide members to replace said lower guide member, whereby a track spacing width between said first and second crawler track arrangements can be adjusted by selecting and removably installing a different one of said replacement guide members.

16. The tracked vehicle according to claim 1, wherein said first and second pivot axles are each respectively rigidly connected to said vehicle body along a single pivot axis.

17. The tracked vehicle according to claim 1, wherein said first and second pivot axles are respectively independently movably connected to said vehicle body, and wherein said first and second pivot axles respectively independently define first and second pivot axes which are selectively in alignment or not in alignment axially with each other.

18. The tracked vehicle according to claim 1, wherein said body frame of said vehicle body includes a plurality of connection locations for each of said first and second pivot axles, and wherein said first and second pivot axles s are each non-permanently and movably connected to a respective selected one of said connection locations to enable a height adjustment of said first and second pivot axles relative to said vehicle body.

19. A tracked vehicle comprising:

a vehicle body, a running gear including separately operable first and second crawler track arrangements arranged at opposite sides of said vehicle body, first and second pivot axles that are respectively arranged along at least one pivot axis on said opposite sides of said vehicle body and that are respectively connected to said vehicle body at said opposite sides thereof and to said first and second crawler track arrangements, so as to allow said running gear to pivot relative to said vehicle body about said at least one pivot axis, and at least one spring arrangement connected to said running gear and to said vehicle body at a location spaced away from said pivot axis;

wherein said vehicle body includes a plurality of connection locations for each of said first and second pivot axles, and wherein said first and second pivot axles are each non-permanently and movably connected to a respective selected one of said connection locations of said vehicle body to enable a height adjustment of said first and second pivot axles relative to said vehicle body.

* * * * *